VIDEO BANDWIDTH-SAVING SYSTEM

Filed Sept. 29, 1959 2 Sheets-Sheet 1

INVENTOR.
WILLIAM F. SCHREIBER
BY Lyon & Lyon
ATTORNEYS

May 15, 1962 W. F. SCHREIBER 3,035,121

VIDEO BANDWIDTH-SAVING SYSTEM

Filed Sept. 29, 1959 2 Sheets-Sheet 2

INVENTOR.
WILLIAM F. SCHREIBER

BY Lyon & Lyon

ATTORNEYS

United States Patent Office 3,035,121
Patented May 15, 1962

3,035,121

VIDEO BANDWIDTH-SAVING SYSTEM

William F. Schreiber, West Acton, Mass., assignor to Technicolor Corporation, Hollywood, Calif., a corporation of Maine Filed Sept. 29, 1959, Ser. No. 843,228
6 Claims. (Cl. 179—15.55)

This invention relates to bandwidth-reduction systems, and, more particularly, to an improvement in systems for reducing the bandwidth required for the transmission of video signals.

This inventor has filed an application for Bandwidth Reduction System for Television Signals, Serial No. 723,286, filed March 24, 1958. Therein is described an arrangement for reducing the bandwidth required for transmitting and reconstituting video signals by passing the video signals through a low-pass filter to separate the continuous-tone low-frequency signals from the remainder. Difference signals, which represent the amplitude of changes which occur in the video signals, are also derived from the video signals. These difference signals are derived by delaying the video signals for a suitable predetermined interval such as that which occurs between picture elements. The current video signal is then subtracted from the delayed video signal, whereby a difference signal is obtained. This difference signal is zero, unless changes have occurred in the video signal. The difference signal is then quantized. Thereafter, apparatus is provided which measures the interval which occurs between quantized nonzero difference signals and establishes a digital number representative of this interval. The quantized difference signal is also represented by a digital number. These two associated digital numbers, together with the continuous-tone low-frequency signals with which they will be associated for reconstitution at the receiver, are then transmitted with a considerable saving in bandwidth.

From experience in operating the above briefly described system, it is found that when all the significant edges in a picture are recognized, a satisfactory rendition of the picture is obtained, even though with such a system it is occasionally possible to create artificial signals which produce spurious effects. However, in areas of a picture where there are no edges but merely fairly large gradients, a number of nonzero difference signals will be obtained. These give rise to extra edge signals at the receiver. The extra edge signals do not deteriorate the reproduced picture appreciably; however, the extra information which needs to be transmitted on account of this effect does increase the required channel capacity. To illustrate this increase, if a threshold is established which must be exceeded by the difference signal in order for a transmission to occur, and if this threshold be three percent of the video-signal amplitude, then a signal having a gradient of three percent per picture element would have 33 successive "edges," not one of which is necessary for high-quality rendition.

An object of this invention is to provide a circuit for distinguishing between nonzero first difference signals which represent true edges and those which do not represent true edges.

Another object of the present invention is to provide a circuit for affording a further reduction of the amount of data which must be transmitted in a system of the type described.

Yet another object of the present invention is to provide a novel bandwidth-reduction system which does not deteriorate the quality of the reconstituted picture and which eliminates spurious edge signals.

These and other objects of the present invention are achieved by deriving, from those first-difference signals which are larger than a predetermined threshold, second-difference signals. The first-difference signals are delayed in being applied to a gate until the second-difference signals derived therefrom can also be applied to that gate. The gate is closed unless the second-difference signals have a suitable amplitude other than zero. The output of the gate is applied to the subsequent encoding and transmission apparatus at the transmitter.

The second-difference signal is derived from the first-difference signal by delaying the first-difference signal for the same interval as the video signal was delayed when the first-difference signal was derived. Thereafter the delayed first-difference signal is subtracted from an undelayed first-difference signal to provide a second-difference signal. Meanwhile, the undelayed first-difference signal is delayed before being applied to the gate for the time required to derive therefrom the second-difference signal, which is applied to control the gate.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
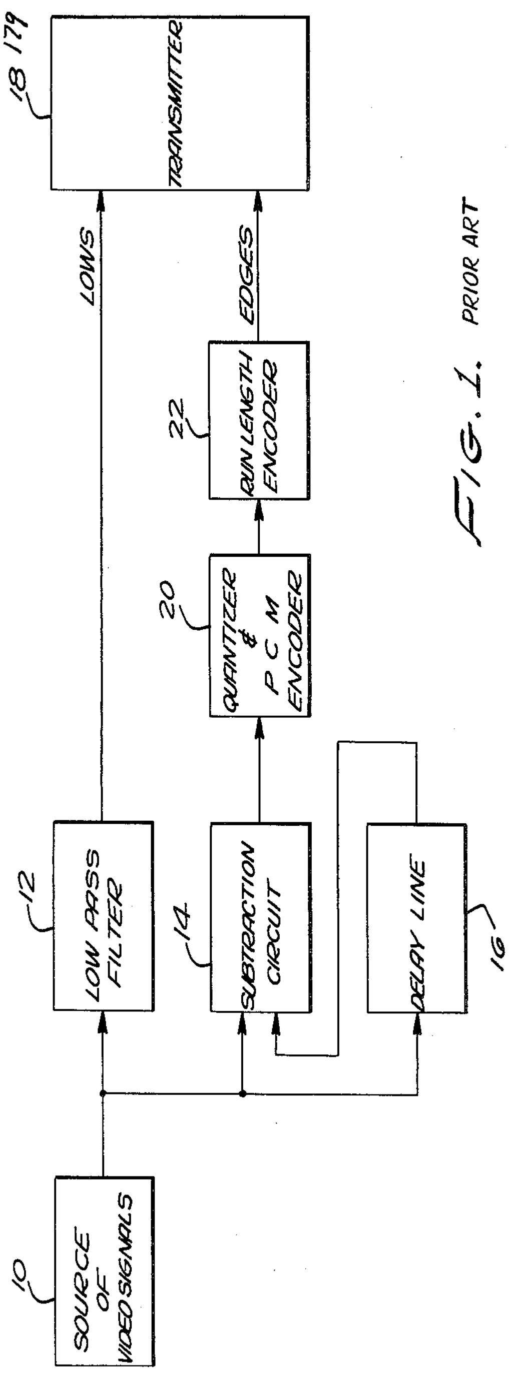
FIG. 1. PRIOR ART
FIGURE 1 is a block diagram of a bandwidth-reduction system for television signals, shown for the purpose of providing an understanding of this invention.
Figure 2:
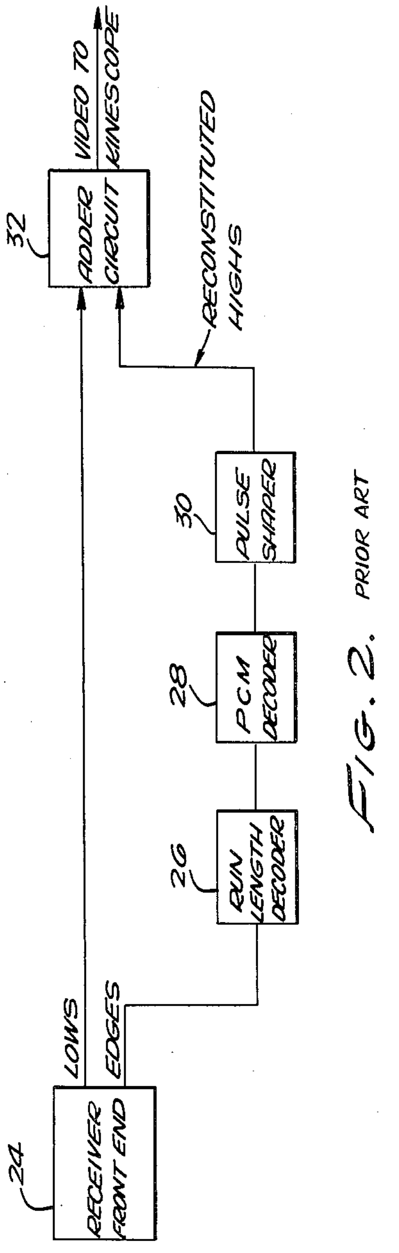
FIG. 2. PRIOR ART
FIGURE 2 is a block diagram of a receiver for the signals transmitted by the system shown in FIGURE 1, also shown to afford a better understanding of the present invention.

FIGURES 1 and 2 herein are the same as FIGURES 1 and 2 in the previously mentioned application by this inventor for Bandwidth Reduction System for Television Signals. An understanding of the operation of these systems is necessary in order to understand and appreciate the present invention. Referring now to FIGURE 1, a source of video signals 10 is representative of the signal output of a television camera, for example. Signals from this source are applied to a low-pass filter 12, to a subtraction circuit 14, and to a delay line 16. The low-pass filter will pass the frequency components of the video signal, for example, below .3 mc., and which is hereafter designated as the continuous-tone "lows" signal. This signal may be directly applied to the transmitter 18 for modulation upon a carrier and transmission in the usual manner, or, if desired, it may be digitalized and transmitted, using the pulse-code modulation arrangement described, for example, in an article published in The Bell System Technical Journal, by W. M. Goodall, entitled "Television by Pulse Code Modulation," vol. 30, pages 39 through 49, January 1951.

The output of the delay line 16 is applied to the subtraction circuit 14, which may be a difference amplifier, for example, and which operates to provide as its output a difference signal. The delay time for the delay line is preferably on the order of ⅛ microsecond, so that the difference signal is actually the difference between adjacent "cells" in the video picture. The output of the subtraction circuit 14, consisting of difference signals, is thereafter applied to a quantizer and pulse-code modulation encoder 20.

A coarse quantization of a particular type is preferably employed. The first step of quantization is made larger than the noise level, so that noise cannot trigger a spurious step. Further, as the amplitude of the signal to be transmitted increases, the steps are made larger. The effect of this type of coarse quantization improves the rendition of edges in the final picture over what would otherwise be obtained with the same number of quantum steps.

The digitalized output of the pulse-code modulation encoder 20 consists of a sequence of binary numbers, each of which comprises a plurality of binary bits, one of which represents whether or not the quantized signal was positive or negative, and the remaining bits represent the amplitude of the quantized signal. These numbers occur at a clock-pulse rate of 8 mc. for a standard 4 mc. bandwidth signal, and will differ from zero only when the amplitude of the difference signal being quantized is larger than the first quantum step. The output of the pulse-code modulation encoder, consisting of these binary numbers, is then applied to a run-length encoder 22.

An arrangement for performing the operation of run-length encoding and decoding is described and claimed in an application by this inventor and George T. Inouye, for a Bandwidth Reduction System, Serial No. 613,234, filed October 1, 1956. A run-length encoding system comprises an arrangement wherein binary numbers, which are derived from the pulse-code modulation system, are replaced by associated first and second numbers. As applied in this invention, the first number will be the pulse-code modulation encoder output described in the previous paragraph, and the second number will represent the length of time measured in clock pulses, or cells, between successive nonzero quantized difference signals.

Alternatively explained, the pulse-code modulation encoder will provide binary numbers at regular intervals which represent the amplitude level of the signals which are applied to the input. It is well known that video signals contain a great amount of redundancy. Accordingly, the level of the picture may not change for large intervals of time. As a result, difference signals will not occur for these large intervals of time. Therefore, the output of the pulse-code modulation encoder will be equal to zero over a considerable interval. To represent this interval, there may be transmitted an associated second number. A run-length encoder includes a counter, or interval-measuring device, which is started by a first of these binary numbers. The interval of time which elapses until a second nonzero pulse-code modulation output number value occurs is detected. At this time, a number representing the corresponding elapsed count, or time interval, is read out of the counter. This is the previously mentioned second number. The first and second number are then stored in a suitable storage means.

The storage means will contain the first and second numbers, properly segregated for reproduction in the lines and fields of the television picture. These first and second numbers may then be read out of the memory for transmission by the transmitter 18 at a constant rate. The low-frequency continuous-tone signals, whether or not digitally represented, and the digitally represented difference signals may be transmitted on separate carriers, or may be modulated on separate subcarriers which, in turn, are modulated on a carrier.

FIGURE 2 is a block diagram of the apparatus required at a receiver in order to reform the received continuous-tone low signal, as well as the first and second numbers representative of edges in the signal, into the original video signal. The receiver front end 24 will include the required RF and IF stages, as well as means for providing in separate outputs the low-frequency signals and the edge signals represented by associated first and second numbers. The associated first and second numbers are applied to a run-length decoder 26 which contains means for storing the received first and second numbers. Means are also included for reading out the first and second numbers at the same read-time rate as they were entered into the storage means at the receiver. This includes means to read out a first and second number and a counter to establish a time interval indicated by the second number. Meanwhile, the first number is applied to a pulse-code modulation decoder 28, the output of which is the reconstituted cell-to-cell difference signal. At the end of each interval dictated by the second number, the next associated first and second numbers are read out of the storage means.

The first numbers are applied to pulse-code modulation decoder 28, which will recreate, in well-known fashion, from the binary numbers applied to its input, voltages having the amplitude levels designated. The output of the pulse-code modulation decoder here will be difference signals, which must then be added to the low-frequency signals in order to recreate the video signal. It has been found, however, that these difference signals, when added to the low-frequency signals without further modification, provide poor edge signals with corresponding degradation of the video. Therefore, the output of the pulse-code modulation decoder 28 is applied to a pulse shaper 30, the function of which is to shape the difference signals so that when they are added by the subsequent adder circuit 32 to the low-frequency signals, the edges of the video signals will be properly recreated.

One suitable arrangement for the pulse shaper is a tapped delay line which has a plurality of taps which are given different weights. The recreated difference signal is applied to the delay line, and the outputs from the various taps are then added to obtain the desired pulse shape. Another preferred arrangement, as described in the previously mentioned application, includes an integrating circuit followed by a low-pass filter and a subtraction circuit. The recreated edge signals are applied to the integrating circuit. The output of the integrating circuit is applied to the low-pass filter and also to an equalizing delay circuit. The outputs from the low-pass filter and the equalizing delay circuit are both applied to the subtraction circuit. The output of the subtraction circuit will have the desired shaped pulses for recreating the high-frequency signals. These can then be added to the low-frequency signals to reconstitute the video signals.

Figure 3:
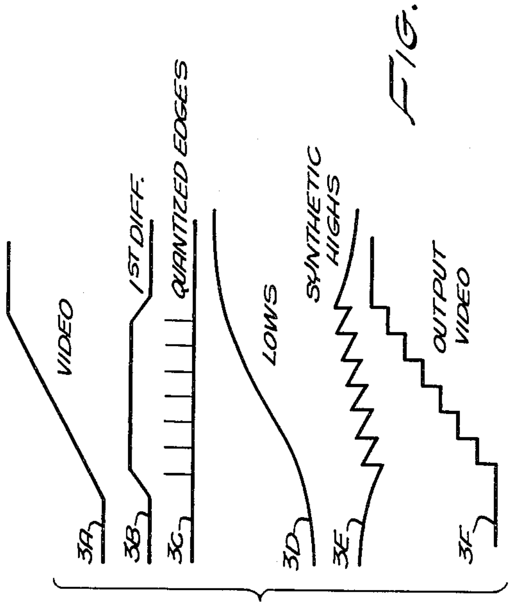
FIGURE 3 is a wave shape diagram shown to illustrate the waveforms obtained in the transmission and receiving system shown in FIGURES 1 and 2.

As thus far described, the circuits are shown and claimed in the previously noted bandwidth-reduction system for television signals by this inventor. Reference is made to FIGURE 3, which is a wave shape diagram showing the waveforms which may be obtained when the circuits shown in FIGURES 1 and 2 are employed. FIGURE 3A illustrates the waveform with what may be described as a ramp type of wave shape. FIGURE 3B illustrates the first-difference signal, which is derived from the video waveform 3A. This first-difference signal is then quantized at the illustrative rate of 8 mc. FIGURE 3C illustrates the quantized edge signals derived from the first difference signal. As illustrated, there are seven of these quantized edge signals. FIGURE 3D illustrates the low-frequency signal derived by filtering the video signals through a low-pass filter. The signals which are transmitted over the transmitter will include the low-frequency signals and the edge signals which are quantized and thereafter run-length encoded.

At the receiver the quantized edge signals will be recreated as synthetic high-frequency signals, the wave shape of which is illustrated in FIGURE 3E. These synthetic high-frequency signals are then added to the low-frequency signals represented by FIGURE 3D. The resulting signal will be that shown in FIGURE 3F. When this signal is applied to a cathode-ray tube, the resultant visual signal is quite acceptable.

Figure 4:
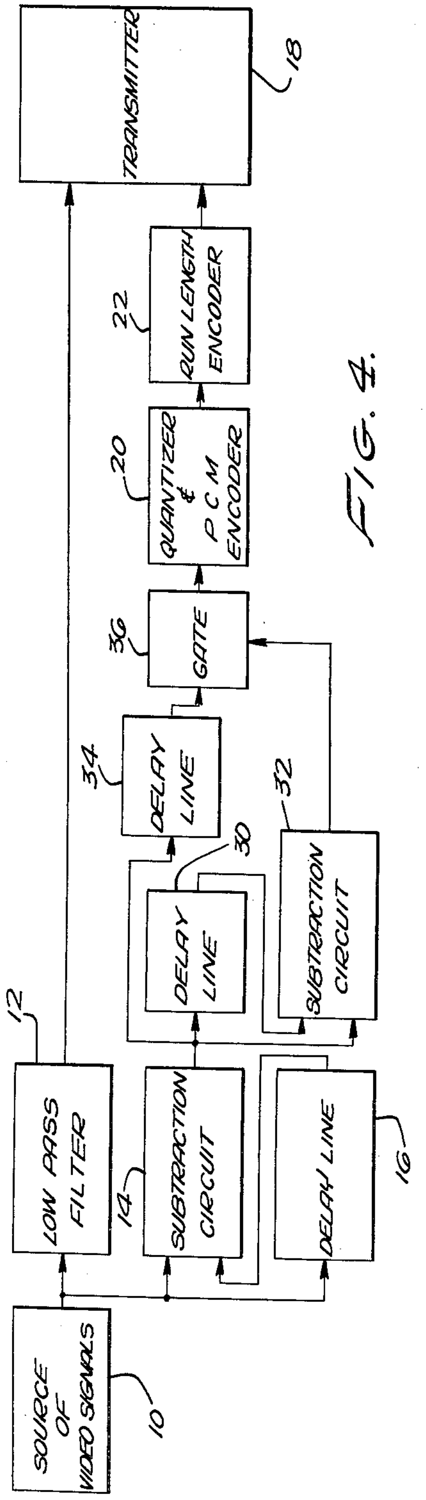
FIGURE 4 is a block diagram of a transmitter in accordance with this invention.

FIGURE 4 is a block diagram illustrating the invention. The apparatus represented in FIGURE 4, which performs the same functions as corresponding apparatus in FIGURE 1, will bear the same reference numerals as those applied in FIGURE 1. A source of video signal 10 again applies its output to the low-pass filter 12 and the subtraction circuit 14, as well as to the delay line 16.

The output of the low-pass filter will be the same as previously described for FIGURE 1, namely, the continuous low-frequency components of the video signals. The subtraction circuit 14 will subtract the undelayed video signal from the delayed video signal to provide a first-difference signal at its output. In accordance with this invention, this first-difference signal is applied to a delay line 30 and to a subtraction circuit 32. The delay of delay line 30 is made substantially identical with the delay of delay line 16. The output of delay line 30 is also applied to the subtraction circuit 32. Thus, the output of subtraction circuit 32 will be a second-difference signal. The amplitude of the second-difference signal will be the difference between an undelayed second-difference signal and one which has been delayed by the interval desired for the differencing operation. This can be cell-to-cell differences, for example, line-to-line differences, or even frame-to-frame differences.

The first-difference signal is also applied to another delay line 34, whose function is to equalize the delay of the first-difference signal with that which occurs in obtaining a second-difference signal wherein the first-difference signal is the undelayed signal. The output of delay line 34, consisting of the first-difference signal, and the output of the subtraction circuit 32, consisting of the second-difference signal, are applied to a gate 36. This gate is closed and will not pass any first-difference signals unless the second-difference signals being applied thereto have a value other than zero and preferably in excess of a predetermined amplitude. A preferred setting for the threshold value required for the second-difference signal in order that the gate 36 be opened is an amplitude of over three percent of the video-signal amplitude.

The processing of the output of the gate 36 is the same as was described for FIGURE 1. The first-difference signal which passes through the gate is quantized by the quantizing and PCM encoding apparatus 20 and thereafter is applied to the run-length coder 22. This serves the function of adding a number to the level-representing number provided by the PCM encoder, which represents the duration of the particular level. The receiver which can utilize the signals transmitted by the arrangement shown in FIGURE 4 is identical with the one represented by FIGURE 2.

Figure 5:
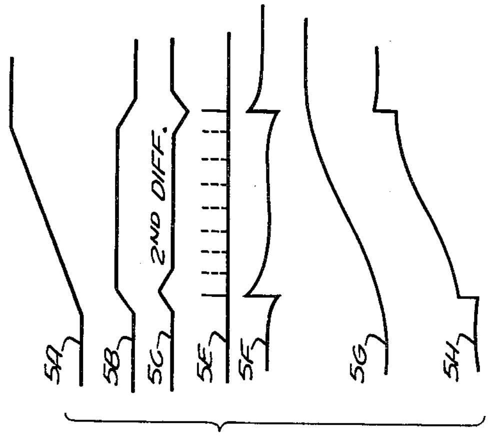
FIGURE 5 illustrates waveforms which are obtained when the present invention is employed.

FIGURE 5 is a wave shape diagram, which illustrates the waveforms obtained with the transmitting arrangement represented in FIGURE 4. Waveform 5A represents the video signal. Waveform 5B represents the first-difference signal, obtained by subtracting delayed from undelayed video. Waveform 5C represents the waveform of the second-difference signal, obtained by subtracting the delayed from the undelayed first-difference signals. It will be noted that, over the region of the first-difference signals where there is no change in the slope of the signal, corresponding to the region of the video signal where the slope is constant, the second-difference signal has a value which is substantially zero, or less than a required threshold value. Accordingly, the quantized edge signals represented by the waveform 5E will only contain two quantized edge signals instead of the seven signals represented in FIGURE 3C. The start and the end of the constant-slope region of the original video signals are the ones which provide quantized edge signals when this invention is employed.

At the receiver, the apparatus for recreating the high-frequency signals will operate with the signals represented by FIGURE 5E to provide the synthetic high-frequency signals represented by the waveform 5F. This is added to the low-frequency signal represented by the waveform 5G, to provide the reconstituted video signal represented by the waveform 5H.

When the reconstituted video signal is applied to a cathode-ray tube for display, it is definitely as acceptable as that obtained when the waveform represented by 3F is displayed. However, as has been described, much less information has been transmitted. A further benefit obtained by the use of this invention is that where the video signal has a definite change in slope followed by a gradual change in slope, the arrangement shown in FIGURE 1 can produce a spurious contour. This is seen as an edge in the picture, although there really should not be an edge. This invention eliminates such spurious contours, as well as unnecessary edge signals.

There has accordingly been shown and described herein a novel improvement in television bandwidth-reduction systems, wherein first-difference signals, derived from video signals which are larger than a predetermined threshold, are still prevented from passing to subsequent encoding apparatus unless they occur coincidentally with second-difference signals derived therefrom, which also have a predetermined threshold.

I claim:

1. In a system for reducing the bandwidth required for transmitting video signals as low-frequency portions of said video signals and first-difference signals obtained by subtracting presently generated video signals from delayed video signals which were generated previously and then delayed, the improvement comprising means for delaying said first-difference signals for a like delay interval, means for subtracting said delay first-difference signals from undelayed first-difference signals to establish second-difference signals, closed gate means to which said first-difference signals are applied, and control means to which said second-difference signals are applied for opening said closed gate means when the second-difference signals are significantly different from zero in amplitude.

2. In a system for reducing the bandwidth required for transmitting video signals as low-frequency portions of said video signals and first-difference signals which are then passed to encoding apparatus, said difference signals being obtained by subtracting presently generated video signals from delayed video signals which were generated previously and then delayed, the improvement comprising means for subtracting presently existing first-difference signals from previously existing first-difference signals to obtain second-difference signals, closed gate means having an output coupled to said encoding apparatus and two inputs, means for applying said first-difference signals to one of said gate means inputs, and means for applying said second-difference signals to the other of said gate means inputs for opening said gate means in the presence of second-difference signals which differ significantly from zero amplitude to pass said first-difference signals to said encoding apparatus.

3. In a system for reducing the bandwidth required for transmitting video signals as low-frequency portions of said video signals and quantized first-difference signals obtained by applying said video signals to a first delay circuit and to one input of a first subtraction circuit, the output of the first delay circuit being applied to the second input of said first subtraction circuit, the output of said first subtraction circuit comprising first-difference signals then being applied to quantization apparatus, the improvement comprising a second delay circuit, a second subtraction circuit having one input connected to receive output from said second delay circuit, means for applying said first subtraction circuit output to said second delay circuit input and to said second subtraction circuit to be subtracted from the output of said second delay circuit to establish second-difference signals, closed gate means, means for applying the output of said first subtraction circuit to said closed gate means instead of to said quantization apparatus, means for applying said second-difference signals to said gate means to render said gate means operative to pass first-difference signals when the amplitude of said second-difference signals exceeds a predetermined level, and means for applying said gate means output to said quantization apparatus.

4. In a system as recited in claim 3 wherein said means for applying the output of said first subtraction circuit to said gate means includes a delay circuit for delaying said first signals over the interval required for the second-difference signal derived therefrom to be applied to said gate means.

5. A system for reducing the bandwidth required for transmitting video signals comprising filter means to which said video signals are applied for filtering the low-frequency continuous-tone portion therefrom, means to which the output of said filter means is applied for transmitting said low-frequency continuous-tone portions of said video signals, means for delaying said video signals for a predetermined interval, means for subtracting said delayed video signals from undelayed video signals to obtain first-difference signals, means for delaying said first-difference signals for said predetermined interval, means for subtracting undelayed first-difference signals from said delayed first-difference signals, closed gate means to which said first-difference signals are applied for enabling the encoding of said first-difference signals, and means to which said second-difference signals are applied for opening said closed gate means when the second-difference signal derived from the applied first-difference signals differs significantly from zero.

6. A system as recited in claim 5 wherein said closed gate means includes a delay circuit for delaying the first-difference signals until second-difference signals derived when said first-difference signals are undelayed can be applied to said means for opening said gate means.

References Cited in the file of this patent

UNITED STATES PATENTS

| | | |
|---|---|---|
| 2,850,574 | Kretzmer | Sept. 2, 1958 |
| 2,927,962 | Cutler | Mar. 8, 1960 |